United States Patent
Roth

(10) Patent No.: US 7,591,137 B2
(45) Date of Patent: Sep. 22, 2009

(54) MOTOR VEHICLE OPERABLE BY MEANS OF CRYOGENICALLY STORED FUEL AND HAVING A COMPRESSED-AIR SYSTEM

(75) Inventor: Lothaire Roth, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/836,869

(22) Filed: Aug. 10, 2007

(65) Prior Publication Data
US 2008/0016883 A1 Jan. 24, 2008

Related U.S. Application Data

(63) Continuation of application No. PCT/EP2006/000756, filed on Jan. 28, 2006.

(30) Foreign Application Priority Data
Feb. 10, 2005 (DE) ........................ 10 2005 005 941

(51) Int. Cl.
F17C 13/08 (2006.01)
(52) U.S. Cl. ........................................ 62/53.2
(58) Field of Classification Search ................... 62/53.2
See application file for complete search history.

(56) References Cited

U.S. PATENT DOCUMENTS

| | | | | |
|---|---|---|---|---|
| 4,300,486 A | * | 11/1981 | Lowther | ...................... 123/39 |
| 4,932,214 A | * | 6/1990 | Nieratscher et al. | .......... 62/50.6 |
| 5,730,216 A | * | 3/1998 | Viegas et al. | ................. 165/233 |
| 5,787,940 A | * | 8/1998 | Bonn et al. | .................... 141/18 |
| 5,884,488 A | * | 3/1999 | Gram et al. | ................... 62/50.6 |
| 6,142,191 A | * | 11/2000 | Sutton et al. | ................... 141/59 |
| 6,182,715 B1 | * | 2/2001 | Ziegler et al. | .................. 141/63 |
| 6,698,211 B2 | * | 3/2004 | Gustafson | .................... 62/50.2 |
| 7,086,236 B2 | * | 8/2006 | Fischer et al. | ................. 62/48.1 |
| 7,117,663 B2 | * | 10/2006 | Knapp | .......................... 60/269 |
| 2003/0221433 A1 | | 12/2003 | Gustafson | |

FOREIGN PATENT DOCUMENTS

| | | |
|---|---|---|
| DE | 37 41 145 A1 | 6/1989 |
| EP | 0 318 904 A2 | 6/1989 |
| JP | 1-172699 A | 7/1989 |

OTHER PUBLICATIONS

International Search Report dated May 29, 2006 with English Translation (Six (6) pages).

* cited by examiner

*Primary Examiner*—William C Doerrler
(74) *Attorney, Agent, or Firm*—Crowell & Moring LLP

(57) ABSTRACT

A motor vehicle operable by a cryogenically stored fuel with a removal device for condensed gas from a tank, particularly from a cryogenic tank. The removal device for the cryogenically stored fuel includes at least one removal pipe having a shut-off valve, which is operated by compressed air.

12 Claims, 1 Drawing Sheet

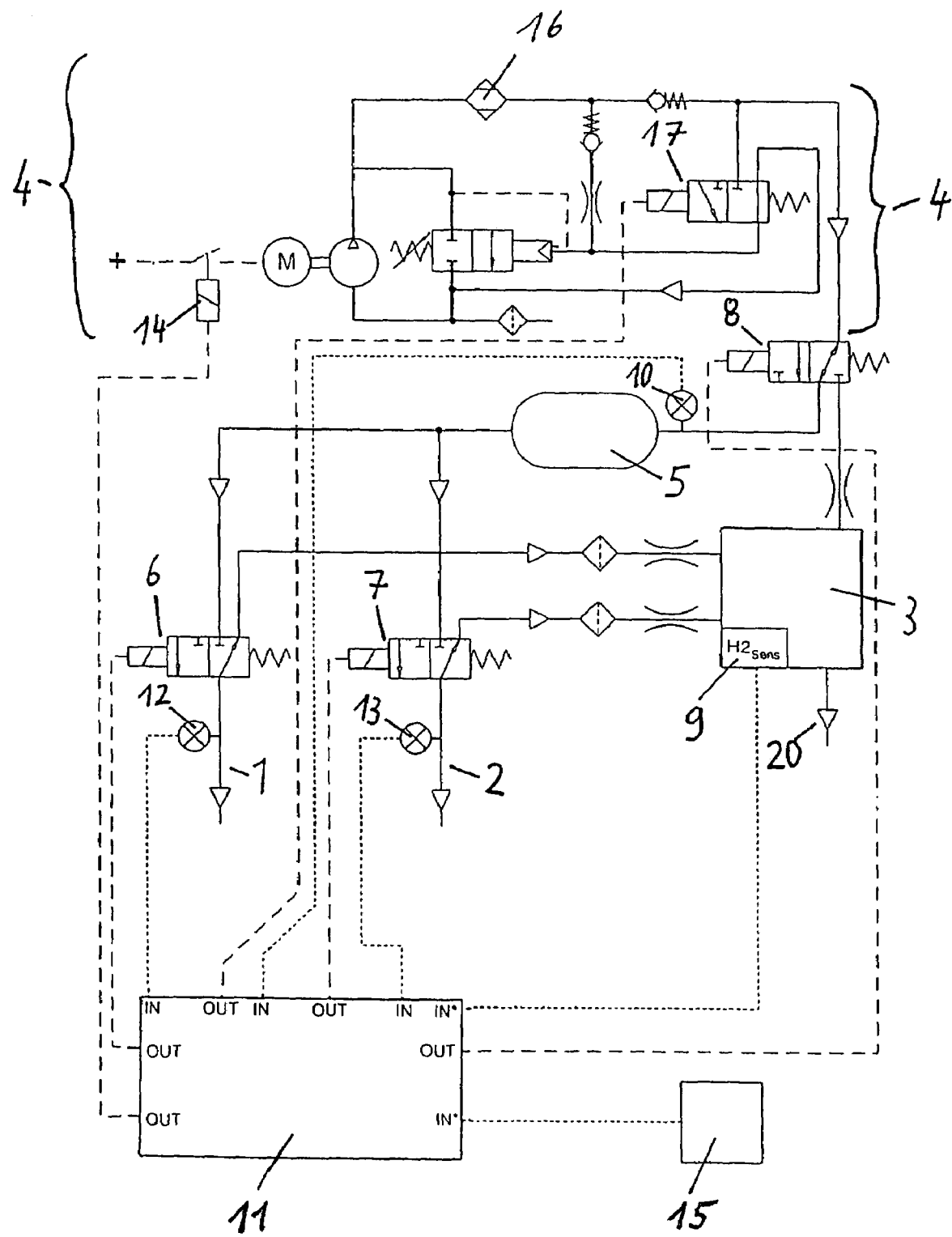

MOTOR VEHICLE OPERABLE BY MEANS OF CRYOGENICALLY STORED FUEL AND HAVING A COMPRESSED-AIR SYSTEM

CROSS-REFERENCE TO RELATED APPLICATIONS

This application is a continuation of International Patent Application No. PCT/EP2006/000756 filed Jan. 28, 2006 which claims benefit to German patent application Serial No. 10 2005 005 941.4 filed Feb. 10, 2005, the entire disclosures of which are hereby incorporated by reference in their entirety.

FIELD OF THE INVENTION

In certain embodiments, the invention relates to a motor vehicle operable by a cryogenically stored fuel with a removal device for removing condensed gas from a tank, particularly a cryogenic tank.

BACKGROUND AND SUMMARY OF THE INVENTION

It is known to drive motor vehicles, for example, by means of hydrogen or natural gas and to store this fuel as a condensed gas in a tank in the motor vehicle. For this liquefied storage, special compression-proof tanks are required which, because of the low storage temperatures, should have a very good insulation. In this case, it is known to use double-walled vacuum-insulated tanks for avoiding the entering of heat from the environment.

Thus, the storage of, for example, hydrogen in mobile vehicles frequently takes place in the form of low-temperature liquefied hydrogen, as condensed gas, since, in this condition, because of the high energy density (in contrast to a storage of warm compressed hydrogen gas) a high range can be achieved which is advantageous for vehicles.

The low-temperature liquid hydrogen supply is stored in the vehicle in the boiling condition in a thermally very well insulated compression-proof tank. The energy density of the boiling hydrogen becomes maximal by storage at a temperature slightly above the boiling temperature at an ambient pressure, approximately 20 K. In the currently technically implemented storage tanks, the hydrogen is typically present at temperatures of from approximately 21 K to approximately 27 K and the corresponding boiling pressures of approximately 2 bar (abs.) to approximately 5 bar (abs.).

In the lower part of the storage tank, the boiling hydrogen is present as a liquid phase with a denser mass (in the following also called LH2) and above the latter, as a gaseous phase (in the following also called GH2).

The direct delivery of the hydrogen (in the following also called H2) from the storage tank into a forward-flow pipe toward a conditioning or consuming device, in the simplest case, takes place by way of the static pressure difference existing between the tank interior and the environment or by means of a targeted pressurization of the storage tank. In principle, it is conceivable in this case to deliver predominantly LH2 or only GH2 as a result of the geometrical design of the forward-flow pipe starting in the tank interior.

From such a cryogenic tank, H2 stored in a boiling condition is generally removed from the gaseous phase as GH2. If H2 is removed from the liquid phase as LH2, in the case of a mobile application, the following conditioning devices, for example, pressure intensifiers, or the operating mode of a consuming device are nevertheless designed for the delivery of GH2. This is necessary because, as a result of possible deviations from the normal position of the mobile tank or as a result of dynamic accelerated conditions, the inflow opening of a removal pipe for LH2 may systematically be temporarily surrounded by flow also at high levels of the gaseous phase. In the course of the evacuation of the mobile tank, this may take place long before the point in time at which the gaseous phase in an identical immobile tank reaches the inflow opening of the LH2 removal pipe by pure removal. For this reason, H2 is predominantly removed from the gaseous phase in the case of mobile applications.

During the H2 removal, heat is supplied to the storage tank which leads to the evaporation of LH2 in the tank and thus to maintaining a tank pressure which is required for the delivery and which otherwise would fall so low as a result of the removal that a delivery would not longer be possible. This heating required for maintaining the pressure takes place by means of a separate heating device, which may be constructed, for example, as an electrically operated heating element, or, for example, directly by feeding heated gaseous H2, which was branched off in a targeted manner from a heated forward flow and is guided (back) into the interior tank.

According to the current state, mobile storage tanks have a removal device for the cryogenically stored fuel which consists at least of one removal pipe having a shut-off valve accommodated close to the tank. However, in most cases, the removal device has at least two removal pipes with at least one shut-off valve respectively,—a first removal pipe for the removal of condensed gas (LH2) and a second removal pipe for the removal of gas (GH2)—.

German Patent Document DE 37 41 145 C2 (U.S. Pat. No. 4,932,214 A1) describes a removal system for liquid nitrogen having a delivery unit arranged outside a storage tank, which delivery unit is connected with the storage tank by way of a suction pipe. On the input side of the delivery unit, a tank-side shut-off valve is provided in the suction pipe, and, on the output side of the delivery unit, an engine side shut-off valve is provided in the feed pipe to the internal-combustion engine. Both shut-off valves are controlled by way of a start-up control of the delivery pump and are illustrated in the drawing as electrically operated solenoid valves.

This has the disadvantage that, in the event of a leakage in the area of the delivery unit and of the shut-off valves, hydrogen may escape into the environment and, together with air, an explosible mixture may be created there, which requires a monitoring of the components carrying the hydrogen by means of sensors, in order to provide a ventilation in time. In this case, it is definitely not easy to avoid leakages in the cryogenic storage area in the case of electrically operated valves, because electromagnetic force is available only to a limited extent as a result of design limits when used in vehicles.

One object of certain embodiments of the present invention is to provide remedial measures for these and other disadvantages.

According to certain embodiments of the invention, a motor vehicle having a consuming device operable by means of cryogenically stored fuel, particularly an internal-combustion engine, and having a tank, particularly a cryogenic tank, for storing the fuel as condensed gas, the tank having a removal device for the cryogenically stored fuel, which removal device consists of at least one removal pipe having a shut-off valve, is characterized in that the shut-off valve is operated by means of compressed air.

This has the advantage that high valve contact pressure forces can be implemented which, for example, are higher than 1,000 Newton, in order to improve the tightness in the cryogenic area. The valve contact pressure forces are generated by stiff springs which can be released pneumatically. These high contact pressure forces at the valve face advantageously reduce also the susceptibility of the shut-off valve to dirt and particles which, in turn, has the result that no filters have to be installed for particles in the micrometer range. This reduces the pressure losses in the tank system, which decreases, for example, the fuelling times, increases the range, etc.

In a preferred embodiment of the invention, the removal device has at least two removal pipes, each having at least one shut-off valve—a first removal pipe for the removal of condensed gas and a second removal pipe for the removal of gas—. This has the advantage that the supply of the consuming device with gas is reliably ensured.

In another preferred embodiment of the invention, the removal device is also used as a filling device for cryogenically stored fuel. This has the advantage that a separately constructed filling device can be eliminated.

When compressed air for operating the shut-off valves is generated by means of a compressed-air system, sufficient compressed air is always available. In addition, the latter can also be used for other purposes, or a compressed-air system, which is present anyhow, is additionally used for operating the shut-off valves. This can advantageously be technically implemented in a cost-effective manner and without high expenditures.

Furthermore, in an advantageous embodiment, certain closed-off areas are constructed in the tank or close to the tank, particularly a secondary system capsule, which areas have a device for their sweeping with compressed air.

In this manner, areas or elements, such as shut-off valves, in which or on which leakages may form, as a result of a closed-off accommodation separate from the environment, can be swept with compressed air by way of a sweeping system when sensors detect an increased gas concentration in the closed-off area. The compressed air for sweeping the closed-off areas can then also be generated by means of the compressed-air system which is part of the motor vehicle. In addition, the outgoing air from the shut-off valve actuators, which occurs when the shut-off valves are closed, can also be used for the sweeping.

In another advantageous embodiment of the invention, the compressed-air system has a compressed-air supply control which, in an alternative manner, either sweeps the closed-off areas or operates the shut-off valves.

This has the advantage that both functions—the sweeping of the gas-enriched zones and the controlling of the shut-off valves—can be carried out by one system, which leads to a reduction of costs.

BRIEF DESCRIPTION OF THE DRAWING

In the following, the invention will be further explained by a preferred embodiment. The single FIGURE shows a pneumatic and electric connection diagram of a device for sweeping gas-enriched zones and for controlling shut-off valves of a system for storing condensed gas of a motor vehicle according to the invention. The solid lines are pneumatic connections, while the broken lines represent the electric control.

DETAILED DESCRIPTION OF THE DRAWING

A cryogenic tank, which is not shown, for storing liquid hydrogen is installed in a motor vehicle, which is not shown. This liquid hydrogen is used as fuel for supplying an internal-combustion, which is not shown and drives the motor vehicle.

The hydrogen is present in the cryogenic tank in two states of aggregation—in the upper part, as gaseous hydrogen and, in the lower part, as condensed gas in liquid form—. A removal device for hydrogen—from the liquid phase LH2 as well as from the gaseous phase GH2—is installed in the cryogenic tank. This removing device supplies the internal-combustion engine with hydrogen by way of two removal pipes, which are not shown—one pipe for the removal of condensed gas LH2 and one for the removal of gas GH2—.

Close to the tank, each removal pipe is equipped with a pneumatically operable shut-off valve, which is not shown and which is operated by means of compressed air from a compressed-air system which is part of the motor vehicle. A first compressed-air pipe 1 operates the shut-off valve of the removal pipe for gaseous hydrogen, and a second compressed-air pipe 2 operates the shut-off valve of the removal pipe for condensed hydrogen.

In addition, by way of the removal pipes, the removal device is also used for filling the tank with cryogenically stored fuel.

In the proximity of the tank, a secondary system capsule 3 is situated which forms a closed-off area and has a sweeping device using compressed air from the compressed-air system which is part of the motor vehicle. In this case, the compressed-air system, in an alternative manner, either sweeps the closed-off areas—here, the secondary system capsule 3—or operates the shut-off valves, controlled by a compressed-air supply control.

The compressed-air system itself is the state of the art, for example, in the case of vehicles with compressed-air-operated brakes. It consists essentially of a compressor 4 (connection diagram elements inside the curly bracket) and of a compressed-air storage device.

The demands on such a pneumatic control system are, on the one hand, the opening or closing of the shut-off valves of the cryogenic tank. On the other hand, it should be possible to sweep the secondary system capsule 3 with air. In order to be able to open the shut-off valves of the cryogenic tank, the compressed-air storage device 5 first has to be filled with compressed air by the compressor 4.

When the defined operating pressure is present in the compressed-air storage device 5, by way of the control valves 6, 7, the shut-off valves can be opened independently of one another as well as jointly. Furthermore, by opening the control valve 8 and by starting the operation of the compressor 4, the secondary system capsule 3 can be swept with compressed air. In principle, a distinction is made here between two cases:

Case 1: When the air pressure in the compressed-air storage device 5 falls below a defined value and a hydrogen sensor 9 does not report hydrogen in the secondary system capsule 3, a pressure sensor 10 emits a signal to a control device 11, and the pressure storage device 5 may be filled with compressed air.

Case 2: When the hydrogen sensor 9 reports hydrogen in the secondary system capsule 3 and a pressure drop is simultaneously present in the compressed-air storage device 5, the secondary system capsule 3 is to be swept as a matter of priority until the hydrogen concentration has fallen below a defined value. Subsequently, the compressed-air storage device 5 is to be filled again with compressed air.

If, despite a sweeping operation, the hydrogen concentration in the secondary system capsule does not decrease, the shut-off valves are closed starting at a certain hydrogen concentration.

There are also two situations for the filling of the cryogenic tank, depending on whether the air pressure in the compressed-air storage device is sufficiently high. If this is so, the two shut-off valves have to be opened in order to fuel the vehicle. For this purpose, it has to be determined by way of the pressure sensor 10 whether the air pressure in the compressed-air storage device 5 is sufficient. When the pressure is high enough, the solenoids of the control valves 6, 7 can be energized, so that they open the connection from the compressed-air storage device to the shut-off valves. As a result, the shut-off valves are acted upon by air pressure and the actual fueling operation can be carried out. By way of additional pressure sensors 12, 13, it can be determined whether pressure is actually present on the compressed-air pipes 1, 2 to the shut-off valves. For terminating the fueling operation, the solenoids of the control valves 6, 7 are switched so that they are currentless, whereby the closing of the control valves 6, 7 opens up the connection between the shut-off valves and the secondary system capsule 3. As a result, the compressed air, which had opened the shut-off valves, can escape, and the shut-off valves close. The compressed air escaping into the environment (shown by arrow 20), simultaneously without any additional energy requirement, causes the sweeping of the secondary system capsule 3 and a reduction of the hydrogen concentration.

However, if the air pressure in the compressed-air storage device 5 is not high enough, it is determined before the filling of the cryogenic tank by way of the pressure sensor 10 that the air pressure in the system is not sufficient for opening the shut-off valves. Now sufficient excess pressure has to be produced by means of the compressor 4. For this purpose, a relay 14 in the compressor 4 is switched by way of the control device 11 to activate the compressor 4. When the control device 11 determines by way of the pressure sensor 10 that the air pressure is sufficiently high, the compressor 4 is switched off again by the relay 14, and the fueling operation can be carried out.

Depending on the situation, there may be differences in starting of the internal-combustion engine. When the air pressure in the compressed-air storage device 5 is high enough, for starting the internal-combustion engine, the shut-off valve of the removal pipe must be opened for the gaseous hydrogen. For this purpose, the control device 11 first has to determine by means of the pressure sensor 10 whether sufficient air pressure is present in the compressed-air storage device 5. If this is so, the control device 11 will trigger the solenoid of the control valve 6 to open the pertaining shut-off valve, whereby the removal pipe between the pressure tank and the internal-combustion engine is opened.

However, when the air pressure in the compressed-air storage device 5 is not high enough, the control device 11 will determine by way of the pressure sensor 10 that the air pressure necessary for the start of the internal-combustion engine does not exist in the compressed-air storage device 5 and the compressed-air storage device 5 first has to be filled. Once this operation is concluded, the control device 11 can open the shut-off valve pertaining to the compressed-air pipe 1 by way of the control valve 6.

For the sweeping operation of the secondary system capsule 3, a differentiation is made between four cases, in which cases a sweeping of the secondary system capsule 3 when the motor vehicle is parked should always be prevented by the control device 11.

Case 1: The internal-combustion engine is operated by hydrogen; the air pressure in the compressed-air storage device 5 is sufficient.

When, in this case, the control device 11 determines an escape of hydrogen in the secondary system capsule 3 by way of the hydrogen sensor 9 during the drive, the secondary system capsule 3 has to be swept with compressed air to eliminate the hydrogen alarm. For this purpose, the control device 11 switches the control valve 8 by way of its solenoid to open the connection of the secondary system capsule 3 and the compressor 4. Simultaneously, the relay 14 is triggered, so that compressor starts to run. The secondary system capsule 3 is now swept with compressed air until the hydrogen concentration falls below a defined value which is measured by the hydrogen sensor 9. If this is the case, the control valve 8 can be closed again and the current circuit to the compressor 4 can be interrupted again by the relay 14.

If, despite a sweeping operation, the hydrogen concentration does not fall in the secondary system capsule 3, starting with a defined hydrogen concentration in the secondary system capsule 3, the internal-combustion engine is switched over to the gasoline operation and the shut-off valves are closed by way of the control valves 6, 7.

Case 2: The internal-combustion engine is operated by hydrogen; the air pressure in the compressed-air storage device 5 is not sufficient.

When a hydrogen alarm occurs during the drive and simultaneously the air pressure in the system is no longer sufficient for leaving the shut-off valve actuators open, it is a priority to eliminate the hydrogen in the secondary system capsule 3. For this purpose, the control device 11 switches the control valve 8 and the relay 14 such that the secondary system capsule 3 is swept. If, during that time, the air pressure in the system falls so low that the shut-off valves can no longer remain open, the internal-combustion engine has to be switched over to the gasoline operation. After the sweeping operation, the control device 11 will still recognize the insufficient air pressure in the system and the compressed-air storage device 5 can be filled again. If despite a sweeping operating, the hydrogen concentration in the secondary system capsule 3 does not decrease, starting at a defined hydrogen concentration in the secondary system capsule 3, the internal-combustion engine is switched over to the gasoline operation.

Case 3: The internal-combustion engine is operated by gasoline; the air pressure in the compressed-air storage device 5 is sufficient.

When the internal-combustion engine is in the gasoline operation, the sweeping operation takes place corresponding to the hydrogen operation, with the difference that in this case the control valve 6 and therefore also the shut-off valve for the removal of gaseous hydrogen is closed.

Case 4: The internal-combustion engine is operated by gasoline; the air pressure in the compressed-air storage device 5 is not sufficient.

In this case, the above has no effect on the operation of the vehicle. This case is important only for an immediate change into the hydrogen operation. The sweeping operation therefore takes place corresponding to that of the hydrogen operation, with the difference that the control valve 6 and therefore also the shut-off valve for the removal of gaseous hydrogen is closed. After the sweeping operation, here also, the compressor 4 continues to operate and fills up the compressed-air storage device 5.

It applies to all described operating cases that an accident is detected by the control device 11 by way of a crash sensor 15 then each control valve 6, 7, 8 is immediately switched currentless. This means that the control valves 6, 7 open the compressed-air pipes 1, 2, as illustrated in the FIGURE, toward the secondary system capsule 3, and the compressed air can escape out of the shut-off valve actuators by way of the secondary system capsule 3.

Likewise, regeneration processes are required for all described operating cases to be able to deliver the water collected from the compressed air from a dehumidifier back into the environment. In principle, during a regeneration process, the air pressure in the system should not fall below the operating pressure, so that the shut-off valves remain open, and the hydrogen operation of the internal-combustion engine is ensured. The number of regeneration processes is to be defined and a function of the size of the compressed-air storage device 5 and of the defined working pressure of the system. In addition, it has to be defined how many regeneration operations are required after the sweeping of the secondary system capsule 3 and after how many switching operations of the shut-off valves one or more regeneration operations have to be carried out. This means that the control device 11 has to detect the number and the duration of the switching operations of the control valve 8. Furthermore, the control device 11 has to know the number of switching operations of the control valves 6, 7 in order to initiate a regeneration operation by way of an additional control valve 17.

When the hydrogen sensor 9 reports hydrogen in the secondary system capsule 3, it is a priority to sweep the secondary system capsule 3 with compressed air.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A motor vehicle comprising:
   a consuming device, operable with a cryogenically stored fuel,
   a tank for storing the fuel as condensed gas, said tank being provided with a removal device for the cryogenically stored fuel, said removal device for the cryogenically stored fuel comprising at least one removal pipe having a shut-off valve, wherein the shut-off valve is operated by compressed air; and
   a compressed-air system which is part of the motor vehicle, said compressed-air system being configured to deliver air to operate the shut-off valve and said compressed-air system including a compressor to generate compressed air.

2. A motor vehicle according to claim 1, wherein said consuming device is an internal-combustion engine.

3. A motor vehicle according to claim 1, wherein said tank is a cryogenic tank.

4. A motor vehicle according to claim 1, wherein the removal device has at least a first removal pipe and a second removal pipe and each removal pipe is provided with at least one shut-off valve, and said first removal pipe is provided for the removal of condensed gas and said second removal pipe is provided for the removal of gas.

5. A motor vehicle according to claim 1, wherein the removal device is also a filling device for cryogenically stored fuel.

6. A motor vehicle according to claim 1, wherein at least one closed-off area is provided in the tank or in the proximity of the tank, said area being provided with a device for sweeping the area with compressed air.

7. A motor vehicle according to claim 6, wherein said at least one closed-off area is a secondary system capsule.

8. A motor vehicle according to claim 6, wherein the compressed air for sweeping the closed-off area is generated by the compressed-air system which is part of the motor vehicle.

9. A motor vehicle according to claim 8, wherein the compressed air system has a compressed-air supply control having a control device which, in an alternative manner, either sweeps the closed-off area or operates the shut-off valve.

10. A method of operating a motor vehicle, said method comprising the steps of:
    generating compressed air with a compressor that is part of a compressed air system which is part of the motor vehicle;
    delivering compressed air to a valve from said compressed air system;
    extracting a condensed gas from a container in said motor vehicle by actuating a valve with said compressed air;
    providing said condensed gas to an internal combustion engine in said motor vehicle.

11. The method of claim 10, further comprising the step of:
    sweeping a closed-off area which is provided in the tank or in the proximity of the tank with compressed air from the compressed air system.

12. A method of operating a motor vehicle, said method comprising the steps of:
    controlling a flow of compressed air from a compressed air system comprising a compressor as part of the motor vehicle to either
    (i) sweep a closed-off area which is provided in a storage tank or in the proximity of the storage tank with compressed air or
    (ii) actuate a valve to extract a condensed gas from a container in said motor vehicle so as to provide said condensed gas to an internal combustion engine in said motor vehicle.

* * * * *